(12) United States Patent
Wessel

(10) Patent No.: US 9,265,130 B2
(45) Date of Patent: Feb. 16, 2016

(54) METHOD OF AUTOMATICALLY PROVIDING AISLE LIGHTING AND APPARATUS TO PERFORM THE SAME

(71) Applicant: Elmer A. Wessel, Lincoln, NE (US)

(72) Inventor: Elmer A. Wessel, Lincoln, NE (US)

( * ) Notice: Subject to any disclaimer, the term of this patent is extended or adjusted under 35 U.S.C. 154(b) by 0 days.

(21) Appl. No.: 14/530,476

(22) Filed: Oct. 31, 2014

(65) Prior Publication Data

US 2015/0123570 A1   May 7, 2015

Related U.S. Application Data

(60) Provisional application No. 61/898,627, filed on Nov. 1, 2013.

(51) Int. Cl.
| | |
|---|---|
| *F21V 33/00* | (2006.01) |
| *H05B 37/02* | (2006.01) |
| *F21V 23/04* | (2006.01) |
| *A47F 11/10* | (2006.01) |
| *F21W 131/40* | (2006.01) |
| *A47F 9/04* | (2006.01) |

(52) U.S. Cl.
CPC ............ *H05B 37/0245* (2013.01); *A47F 11/10* (2013.01); *F21V 23/0471* (2013.01); *F21V 33/0012* (2013.01); *H05B 37/0227* (2013.01); *A47F 9/04* (2013.01); *F21W 2131/40* (2013.01)

(58) Field of Classification Search
CPC ........... H05B 37/0227; H05B 37/0245; F21W 2131/40; F21V 23/0471; F21V 33/012
See application file for complete search history.

(56) References Cited

U.S. PATENT DOCUMENTS

2010/0296285 A1* 11/2010 Chemel et al. ................ 362/235

\* cited by examiner

*Primary Examiner* — Thomas M Sember
(74) *Attorney, Agent, or Firm* — Geoffrey E. Dobbin; Dobbin IP Law P.C.

(57) ABSTRACT

A method and system for lighting merchandising aisles, in particular check-out aisles, is disclosed. A control unit activates lighting of the aisles automatically when the presence of a cashier is detected. Communicative links between control units in adjacent aisles allow lights to be controlled despite aisle space between the control unit and lighting hardware. The communicative link may be wireless. Frequency switching or encoding may be used to pair sets of controllers for a given aisle to the exclusion of others. Override switches are also provided as are power output for the lighting hardware and other ancillary hardware. The invention may also be adapted to merchandizing gondolas and end caps.

4 Claims, 4 Drawing Sheets

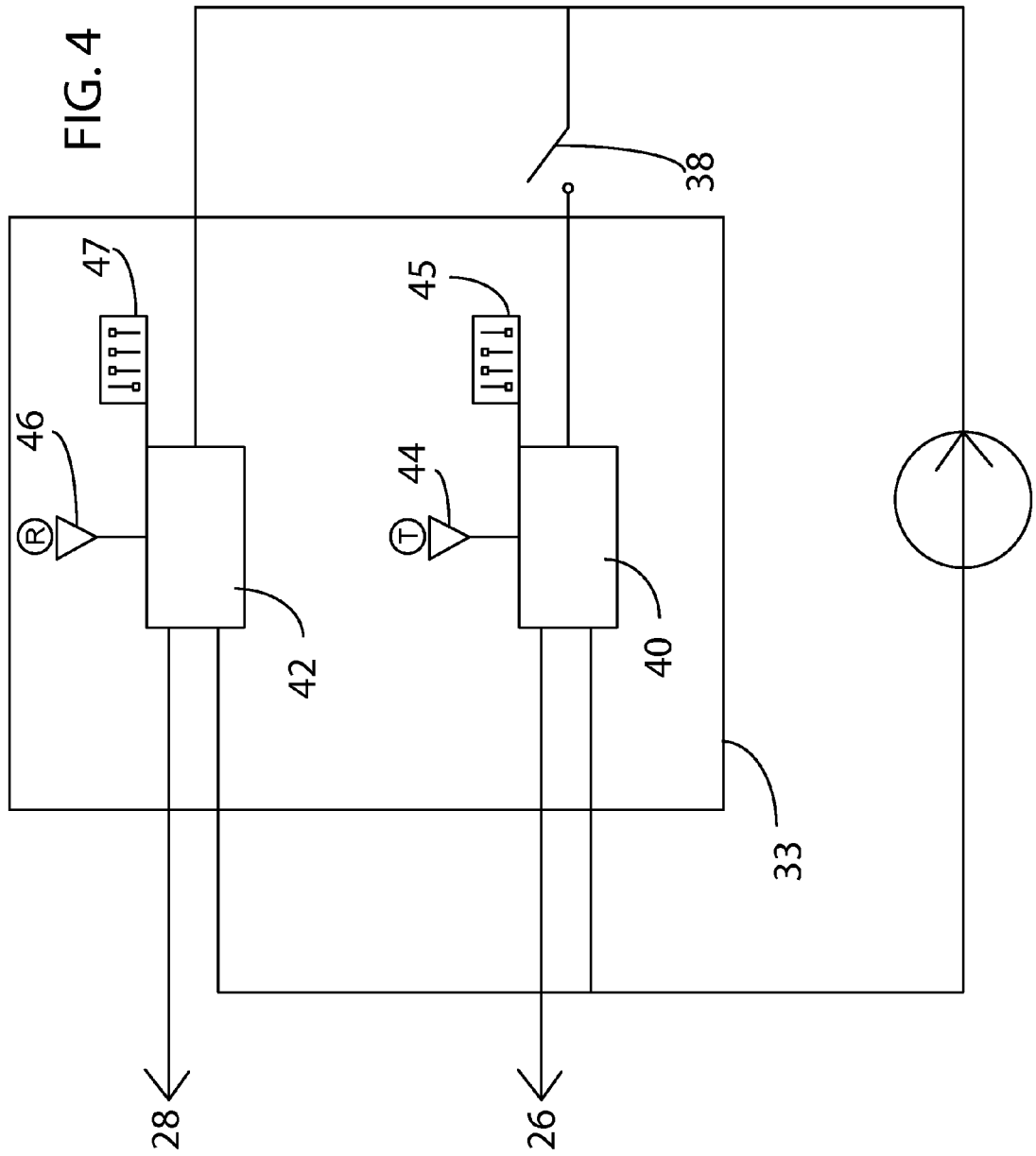

METHOD OF AUTOMATICALLY PROVIDING AISLE LIGHTING AND APPARATUS TO PERFORM THE SAME

CROSS-REFERENCES TO RELATED APPLICATIONS

This Application claims priority as a non-provisional perfection of prior filed U.S. Application No. 61/898,627, filed Nov. 1, 2013, and incorporates the same by reference in its entirety herein.

FIELD OF THE INVENTION

The present invention relates to the field of merchandisers and more particularly relates to a method of automatically providing aisle lighting and the apparatus to perform the same.

BACKGROUND OF THE INVENTION

A consumer economy is driven by the purchases of consumers. To that end, many studies, strategies and methods have been performed and developed in order to encourage consumer spending on various products. It is also commonly known that customer service is a large factor in generating the good will of consumers and that good will generates purchases. To this end, providing an intuitive and expected shopping experience encourages both good will and sales.

One aspect of the common consumer experience is the check-out aisle. The check-out aisle is essentially a queue, or a number of queues, for customers to interact with cashiers and tally their items for payment. The usual construction is a plurality of parallel islands, each one headed with a cashier's station. These parallel islands form aisles therebetween. By convention, the sides of the aisle are named in accordance with a customer's perception as he is walking down the aisle towards the cashier, with the side on the customer's right side being termed "customer right" and conversely the other side being "customer left." The cashier may be located on either the customer right or customer left sides. Check-out aisles are commonly disparaged in the culture and any improvement to the experience is generally noticed. One common failing is the indication of which aisles may or may not be open. In practice, most merchants with multiple check-out aisles have some sort of indicator, a sign or light, to tell consumers when an aisle is open or closed. Often, the aisle may be lit when open or not when closed as a further indicator. However, a system is only as good as the human operating it. Many times, the cashier may or may not get the proper signage or lighting activated or deactivated to adequately let consumers know the aisle's status. While this may prove a minor annoyance when an aisle is open and indicated as closed, it can become a major inconvenience when the aisle is closed and is indicated as being open, which can happen if the cashier takes a quick break. What is needed then is an automated indication of an aisle's status. Such indication may desirably activate or extinguish the aisle lighting and should have an override system for human intervention. The system may also be adapted to the center-of-store aisles, or "gondolas," and aisle end caps.

It is also well known in the art that appropriate lighting may enhance the display of product. It is for this reason that showrooms were developed to showcase items like automobiles, large appliances, and larger furniture. However, lighting systems in the art of grocery merchandizing is far behind other arts—being limited to utilitarian lighting to make sure people can see product. Interactive lighting displays are not generally utilized in grocery aisles.

The present invention is a method by which an aisle is automatically indicated as being open or closed and the system and components necessary for the method to work. The present invention represents a departure from the prior art in that the method and system of the present invention allows for automatic status indication of a given aisle as either being ready for business or closed. The system is keyed to the physical presence of a cashier so that an aisle may be automatically indicated as open or closed without intentional human intervention. It is important to note that the aisle indication is that the product in the check-out aisle is lit, thereby automatically drawing a customer's attention to the product as an open aisle is identified. This lighting enhances the customer experience and showcases product in the "impulse buy" region of the store where customers must go and spend some time before being checked out, thus increasing the likelihood that a customer will buy an impulse item.

SUMMARY OF THE INVENTION

In view of the foregoing disadvantages inherent in the known types of aisle status indication methods and grocery lighting displays, this invention provides an automated indication system. As such, the present invention's general purpose is to provide a new and improved aisle indication method and system that is automatically activated and deactivated by a cashier's presence and also enhances the display of merchandise in an aisle.

To accomplish these objectives, the best mode system comprises a proximity sensor by the cashier's island which registers the presence or absence of a person. The system then lights the near side of the aisle and sends a wireless signal to the neighboring island which lights the far of the aisle. It should be readily appreciated, then, that the two halves of each island are two separate circuits. However, the circuits may be compactly assembled with a common interface, with each half accessing portions of the interface in a manner to create two separate, parallel circuits. The interface may also be adapted for center-of-store aisles, which are formed in a manner similar to the check-out aisles with rows of parallel merchandisers, or "gondolas," and for end caps, which may be found on any aisle.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a schematic of a control unit for use in the described embodiment of the present invention.

DETAILED DESCRIPTION OF THE PREFERRED EMBODIMENT

With reference now to the drawings, the preferred embodiment of the method and apparatus is herein described. It should be noted that the articles "a", "an", and "the", as used in this specification, include plural referents unless the content clearly dictates otherwise.

Figure 1:
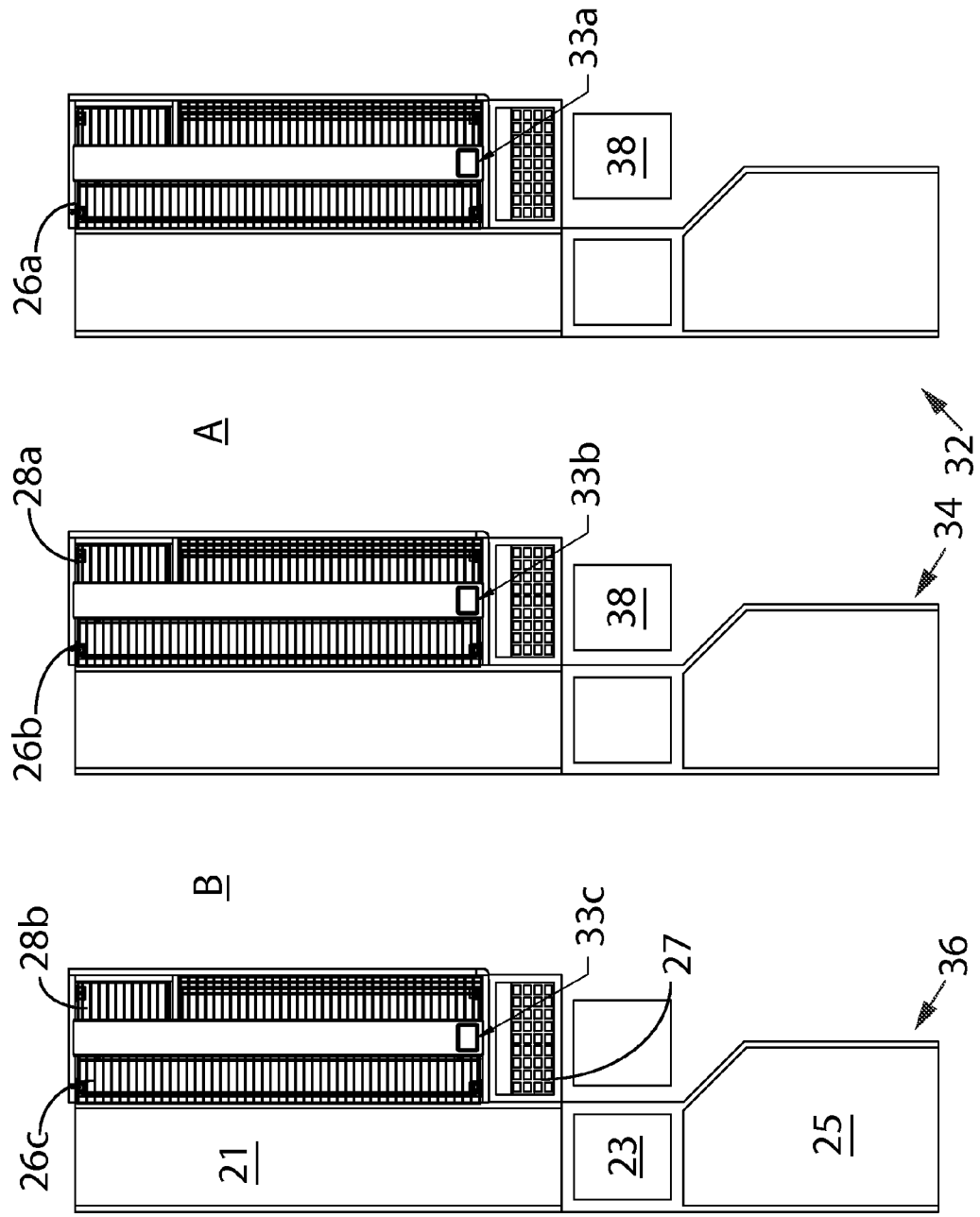
FIG. 1 is a schematic depicting a series of checkout aisles utilizing the method of the present invention.
Figure 2:
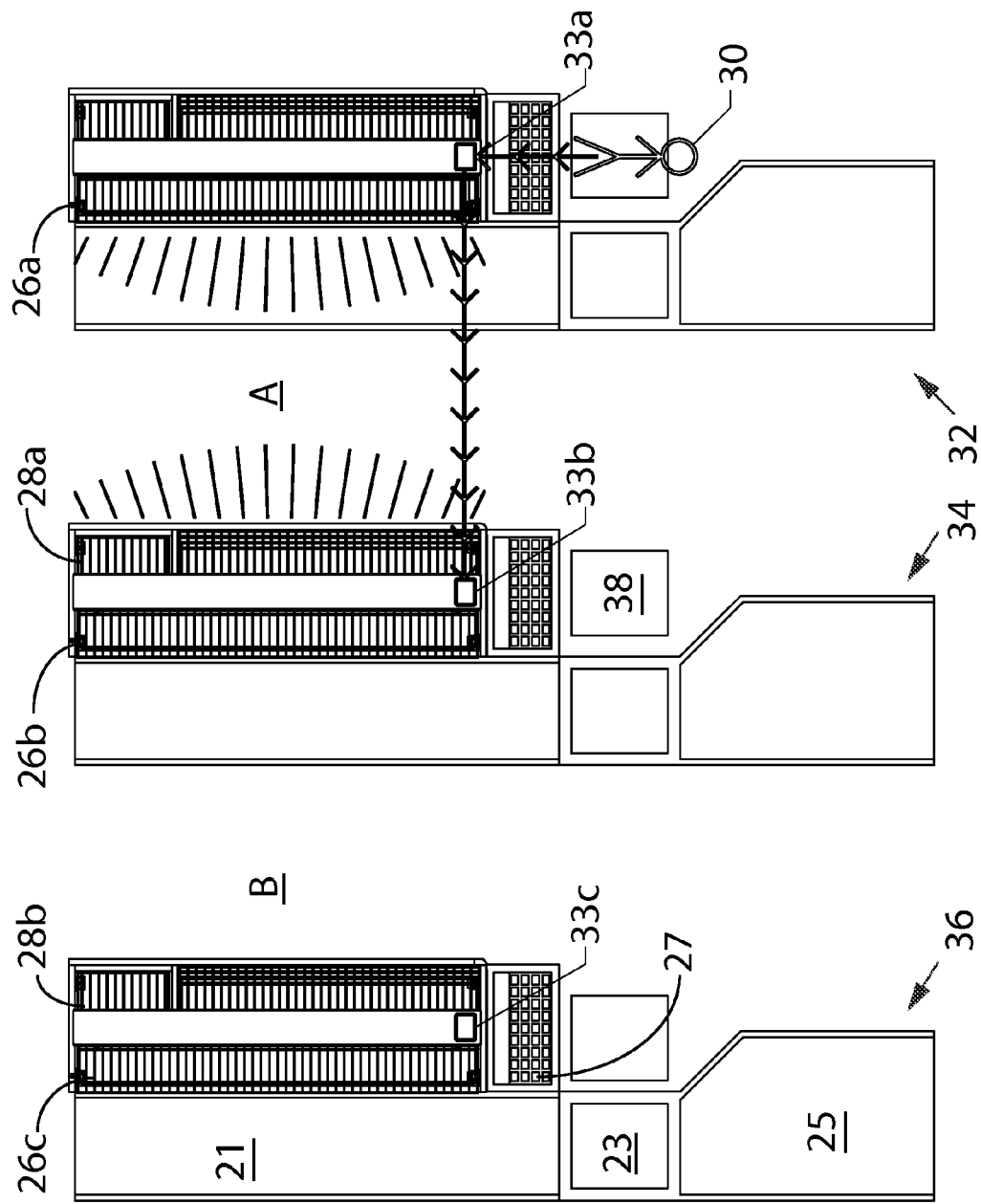
FIG. 2 is the series of check out aisles of FIG. 1, with one aisle activated.
Figure 3:
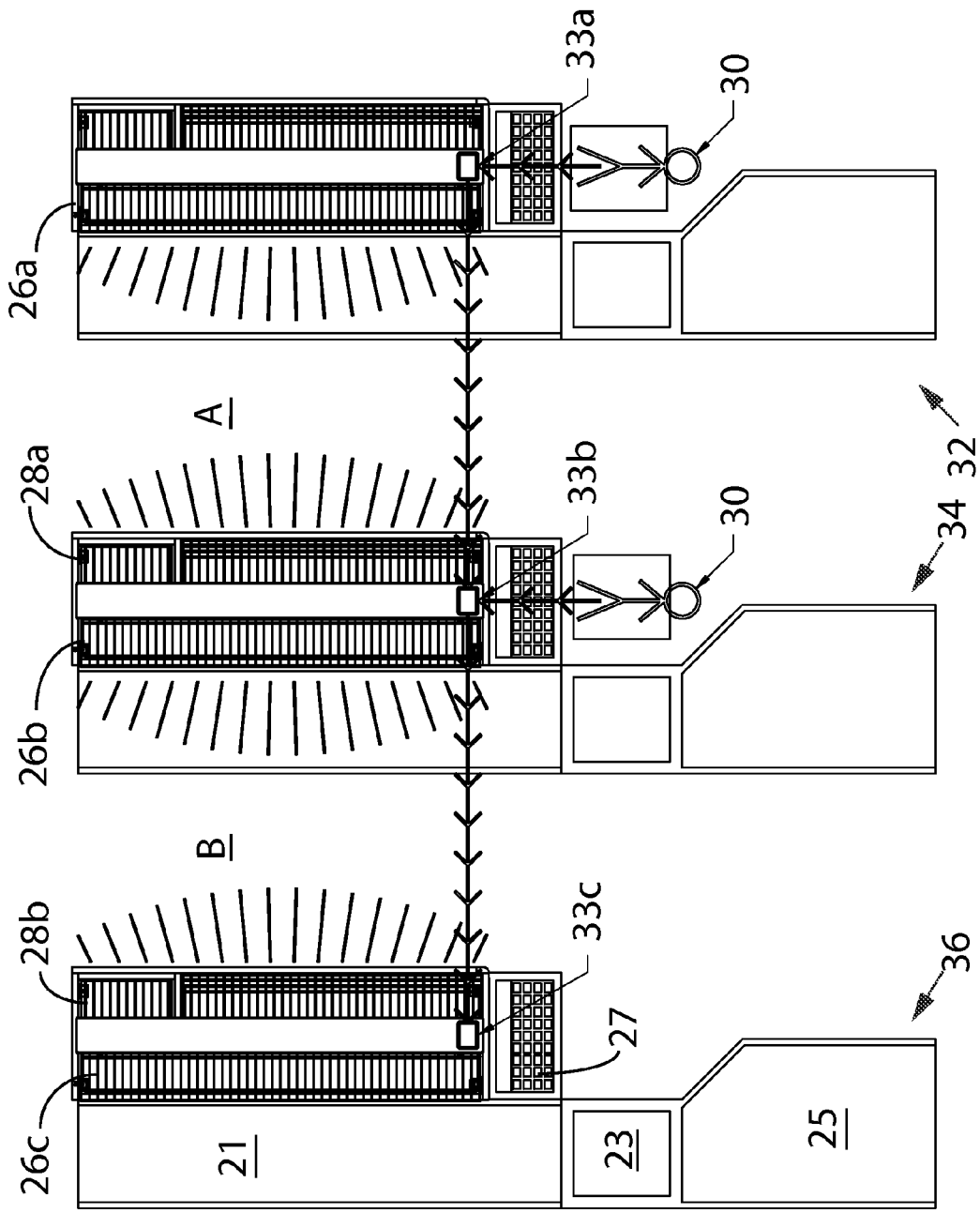
FIG. 3 is the series of check out aisles of FIG. 1, with two aisles activated.

With reference to FIGS. 1-3, the method is illustrated. A standard grocery aisle set is comprised of a plurality of parallel islands 32, 34, 36 where two adjacent islands define a single aisle A, B. The islands may be manned check-out islands, as shown in the figures, or any other type of island whereby an aisle may be created. With a manned check-out island, each island would typically have a conveyer belt 21, scanning apparatus 23, bagging queue 25, operator control unit 27 and two sides of merchandising. The cashier's station orientation defines one side of the island as a "master" side of the island 32 (over the conveyer belt 21). The other side of each island, then, is a "slave" side which is controlled by the master side of the adjacent island. In the Figures, each aisle A, B has the customer left side 26a, 26b, formed by the master side of island 32, 34 while the slave side of islands 34, 36 is the customer right 28a, 28b. It should be readily apparent that the selection of which side is master or slave is arbitrary and should be based on convenience caused by the design of the check-out aisles. It seems convenient as a best mode to make the island in which the cashier 30 is located each aisle's master side, whether that island forms the customer right or the customer left side of the aisle. Therefore, as illustrated in the figures, aisle A is formed between islands 32 and 34. The cashier 30 for aisle A is located in island 32. The customer left side of aisle A is side 26a of island 32 and serves as the master side. The customer right side of aisle A is side 28a of island 34 and serves as the slave side. This construction repeats for each aisle. Of course, this is a general construction; end aisles would be modified depending on which side of the aisle bank they would be located. In each island 32, 34, 36 is a control unit 33a, 33b, 33c coupled to a switch. The control unit 33a for an aisle A then selectively powers the master side 26a of its island 32 and the slave side 28a of the adjacent island 34, as shown in FIG. 2, to turn on display lighting. The preferred method is to form a communicative link between adjacent islands' 32, 34 control units 33a, 33b such that the control unit 33b for the slave side 28a becomes a slave switch of the control unit 33a for the master side 26a.

The switch 38 which activates the control unit 33a may be of any sort that could be used in the setting. This could be a simple toggle switch, a computer activated control, an electric eye, proximity sensor, pressure sensitive switch (as illustrated), or other presence-sensing device so that the mere presence of a cashier 30 (FIG. 2) would activate the control unit 33a. It is, of course, understood that other lighting, such as a "lane open" indicator or end cap lighting may also be controlled by the controller 33a and that an override switch may be provided. It is also understood that each successive aisle, such as aisle B, would be similarly controlled with control unit 33b activating the master side 26b of island 34 and slave side 28b of island 36 (FIG. 3). In this manner, the control units 33a, 33b, 33c (except for the two units on the end islands in an area) may then all be once a primary control unit and also a slave switch.

The actual control units 33 (FIG. 4) may then be understood to have two processors, one for the master side 40 and one for the slave side 42, or a single processor that may handle both sides. The slave processor 42 may contain or otherwise actuate a switch to divert power to the customer right 28 side of the aisle. The actual communicative link may be physical or wireless connection. In the event a wireless connection is used, which is the preferred method, a transmission means 44 and reception means 46, or a single transceiver means, is then needed. Also, a form of encoding is needed so that individual control units may be paired together for proper transmission and receipt of communicative signals. The preferred method is to utilize two banks of binary coding DIP switches, one bank for transmission of a signal 45, the other for receipt of another signal 47, so as to pair a control unit 33 with another as either a master or a slave switch so that both customer left 26 and customer right 28 sides of an aisle may be controlled. In theory, assuming one setting is "off", each control unit may be programmed for one of 2n−1 aisles, where n is the number of DIP switches in a bank. The internal switching can either change the transmit/receive frequency of the signal or it can encode the signal in a manner such that only the paired units properly communicate with each other. Other means of pairing selection may also be used, both in the mechanical selection of pairs and the communication of the pairs, without deviating from the scope of this disclosure. It is also preferred that a proximity sensor be utilized to detect the presence of a cashier and that the proximity sensor be located on or close to the control unit. The control unit 33 may also feature the override switch or switches and should feature power outlets for control of both the customer right and left aisle sides and any additional lighting or electrical systems desired, such as for the end cap or the "lane open" indicator.

The invention may be adapted to inner store aisles by placing a motion or other proximity sensor in a particular area of a gondola or end cap. Lights may then be activated to showcase product on the gondola or end cap based on the presence of a consumer.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A method of aisle lighting in a merchandising setting, for at least one aisles comprising a plurality of adjacent islands with customer left and customer right sides, one of the customer left and customer right sides being a master side of an island and one being a slave side of an adjacent island, the method comprising:

providing the aisle a sensor to detect a prerequisite condition;

operatively connecting lighting on the master side of the island to the sensor;

providing remote and operable communication between the sensor and lighting on the slave side of the adjacent island;

activating lighting on the master and slave sides when the sensor is activated by detecting the prerequisite condition; and, deactivating the lighting on master and slave sides when the sensor detects the prerequisite condition is no longer applicable.

2. The method of claim 1, the sensor being a selected from the group of sensors consisting of motion sensors, weight sensors, IR sensors, and RFID sensors.

3. The method of claim 1, further comprising providing a master override switch.

4. The method of claim 1, the aisle being a check-out aisle and the prerequisite condition is the presence of an operator.

* * * * *